No. 671,197. Patented Apr. 2, 1901.
G. F. RICKER.
CARPET BEATING MACHINE.
(Application filed Jan. 2, 1901.)

(No Model.) 2 Sheets—Sheet 1.

Witnesses: Inventor:
George F. Ricker,
by N. C. Lombard Atty.

No. 671,197. Patented Apr. 2, 1901.
G. F. RICKER.
CARPET BEATING MACHINE.
(Application filed Jan. 2, 1901.
(No Model.) 2 Sheets—Sheet 2.
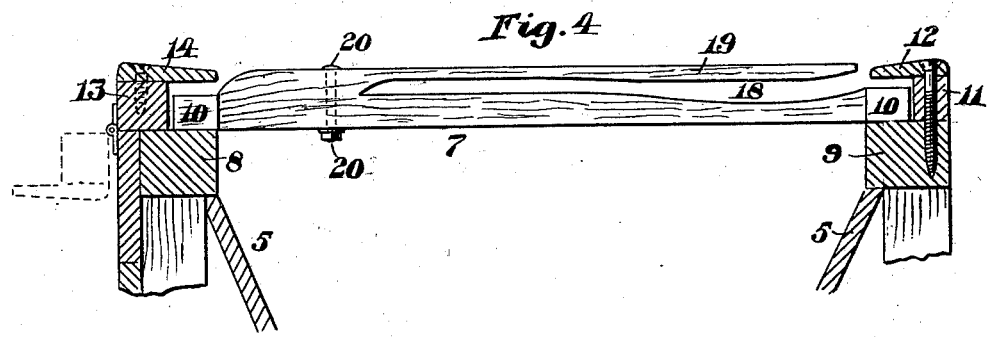
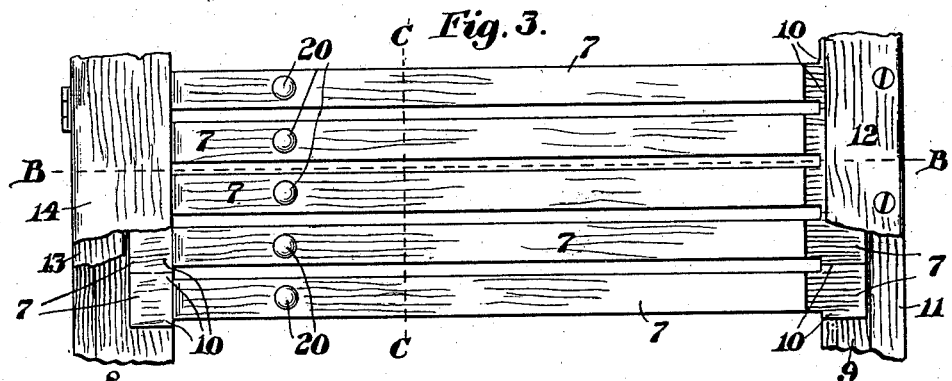
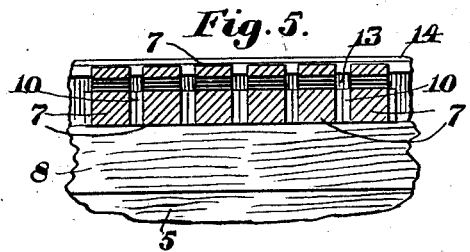
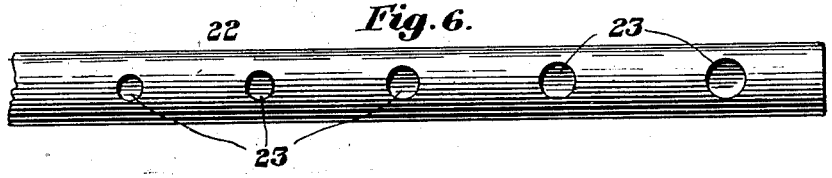
Witnesses:
Inventor:
George F. Ricker,
by N. C. Lombard
Atty.
THE NORRIS PETERS CO., PHOTO-LITHO., WASHINGTON, D. C.

UNITED STATES PATENT OFFICE.

GEORGE F. RICKER, OF CAMBRIDGE, MASSACHUSETTS.

CARPET-BEATING MACHINE.

SPECIFICATION forming part of Letters Patent No. 671,197, dated April 2, 1901.

Application filed January 2, 1901. Serial No. 41,903. (No model.)

*To all whom it may concern:*

Be it known that I, GEORGE F. RICKER, of Cambridge, in the county of Middlesex and State of Massachusetts, have invented certain new and useful Improvements in Carpet-Beating Machines, of which the following, taken in connection with the accompanying drawings, is a specification.

My invention relates to carpet-beating machines, and is an improvement upon the machine shown and described in the Letters Patent No. 274,224, granted to me March 20, 1883; and it consists in certain novel features of construction, arrangement, and combination of parts, which will be readily understood by reference to the description of the accompanying drawings and to the claims hereto appended, and in which my invention is clearly pointed out.

Figure 1:
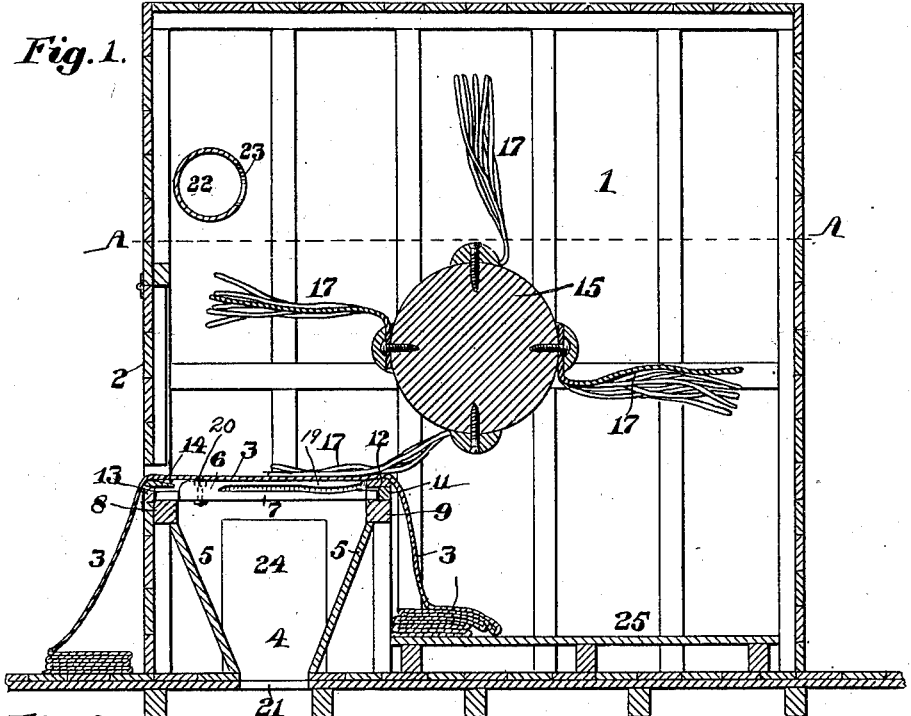
Figure 2:
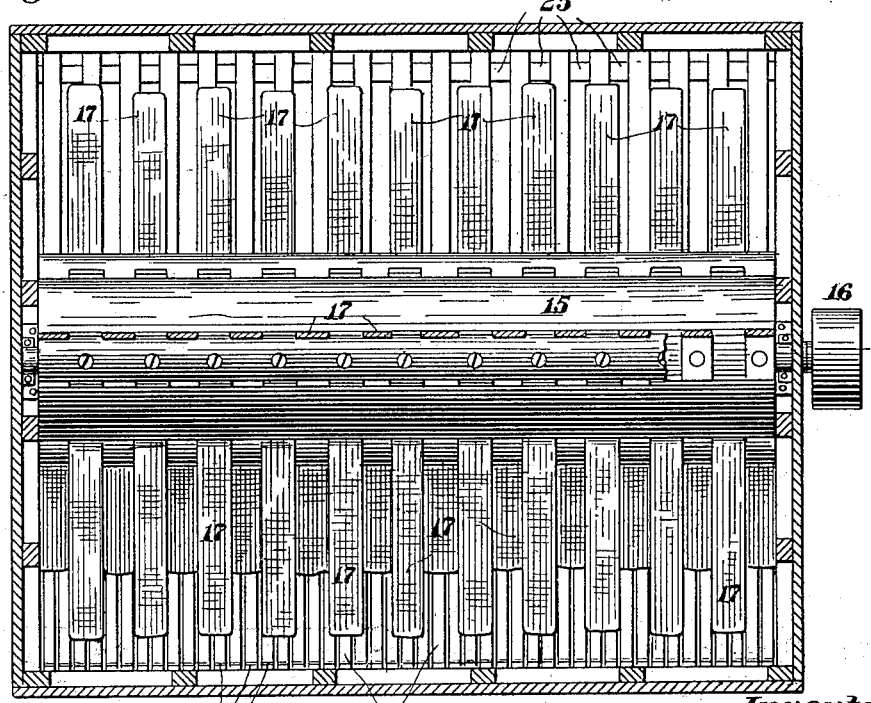

Figure 1 of the drawings is a vertical transverse section of a machine illustrating my invention. Fig. 2 is a sectional view of the same, the cutting plane being on line A A on Fig. 1. Fig. 3 is a plan of a portion of the carpet-supporting bed, drawn to an enlarged scale. Fig. 4 is a section on line B B on Fig. 3. Fig. 5 is a section on line C C on Fig. 3, and Fig. 6 is an elevation of the dust-exhausting pipe.

In the drawings, 1 is the beating-chamber, provided with the door 2, hinged at its upper edge and adapted to be turned upward for the purpose of introducing the carpet 3 into the chamber 1.

The dust-receptacle 4 has its two longest sides 5 5 inclined, as shown, and supports at its top the carpet-supporting bed or grating 6, composed of a series of bars 7 of a peculiar construction, to be hereinafter described, which bars rest at their two ends upon the front and rear walls of the dust-receptacle 4, said series of bars being arranged side by side and parallel to each other, with their end portions substantially in contact, but fitted loosely enough to permit each bar to rise and fall slightly independently of the other bars of the series, said grating extending the whole length of the front of the beating-chamber, as shown in Fig. 2.

The grate-bars 7 are preferably made of hard wood, as maple, though they may be made of metal, if desired, and have their end portions, which rest upon the supporting-timbers 8 and 9, provided with lateral projections 10 of about one-fourth of an inch on each side, so that when placed in position there will be an opening of about one-half of an inch between each two adjacent bars, through which the dirt falling from the carpet escapes into the dust-receptacle 4.

To keep the grate-bars 7 in position endwise, a strip of wood 11 is secured to the timber 9, which supports the rear ends of said bars in a fixed position, said strip 11 having a vertical thickness somewhat greater than the end portions of said bars and having firmly secured thereto the cap-plate 12, which projects over the ends of the bars 7, as shown in Figs. 1 and 4, and the timber 8, which supports the front ends of the bars 7, has hinged thereto a strip of wood 13, similar to the rear strip 11, said strip 13 having firmly secured to its upper surface the cap-plate 14, which projects over the front ends of the bars 7, as shown in Figs. 3 and 4.

The hinging of the strip 13 with its cap-plate 14 is for the purpose of facilitating the insertion and removal of the grate-bars when necessary, and when turned up into the position shown in full lines in Fig. 4 it may be secured in said position by any suitable fastenings.

The beating-cylinder 15, its shaft, the driving-pulley 16, the beater-straps 17, and the manner of attaching the beaters 17 to the cylinder 15 are all constructed, arranged, and operate substantially as in my before-cited Letters Patent.

Each grate-bar 7 is provided with a longitudinal slot 18, extending from near its rear end toward its front end about three-fourths of its length, thereby forming a spring-arm 19, the rear end of which is separated from the main body of said bar, as shown in Fig. 4, and yields to the blows applied to the carpet resting thereon by the beater-straps 17, while at the same time the whole bar rises and falls more or less as the successive blows are struck upon the carpet, thereby greatly facilitating the removal of the dust from the carpet.

To guard against possible fracture of the grate-bar by splitting the same between the front end of the slot 18 and the front end of said bar, I insert a metal bolt 20 vertically through said bar just in front of the end of said slot, as shown in Figs. 3 and 4, though I do not wish to be limited to the use of the reinforcing-bolt, as if good stock is used the bolt will not be necessary, as I have used such bars without the bolt for nearly a year without splitting one.

Suitable draft-pipes (not shown in the drawings) may be connected with the outlets 21 of the dust chamber or hopper 4 and to an exhaust-blower, also not shown, as a means of removing the dust or dirt as it is beat from the carpet and also helping to remove the dirt from the carpet and acting as a disinfectant by thoroughly airing the carpet while it is being beaten.

A draft-pipe 22 extends longitudinally along the front side of the beating-chamber 1, just above the door 2 and through one end wall of the beating-chamber 1, and is connected with the exhaust-blower (not shown) in any suitable manner, said pipe having on its rear side a series of openings 23, graduated in size, with the largest opening located near the end of the pipe farthest from the blower and the smallest opening being at or near the opposite end of the beating-chamber, all as shown.

A door 24 permits access to the dust-receptacle 4 whenever necessary for any purpose, and 25 is a slatted rack to receive the carpet as it is delivered from the bed or grate, substantially as in my before-cited patent.

What I claim as new, and desire to secure by Letters Patent of the United States, is—

1. In a carpet-beating machine, a carpet-supporting grating composed of a series of independent grate-bars arranged side by side with their supported ends in substantial contact with each other, with a dirt-delivering space or opening between the main bodies of each adjacent pairs of grate-bars, and each bar provided on its upper or carpet-supporting side with a spring-arm to take the blow of the beaters in combination with suitable supports for the ends of the grate-bars to rest upon.

2. In a carpet-beating machine, a grate-bar for supporting the carpet while being beaten, having its supporting ends made wider horizontally and thinner vertically than its main body, and having its main body slotted to form on its upper side a spring-arm as set forth.

3. In a carpet-beating machine, the carpet-supporting grating composed of a series of grate-bars 7, each provided with the lateral projections 10, at their supported ends, and with the spring-arm 19 in combination with suitable supports for the ends of said grate-bars, as set forth.

4. The grate-bar 7 provided with the spring-arm 19 in combination with the reinforcing-bolt 20.

In testimony whereof I have signed my name to this specification, in the presence of two subscribing witnesses, on this 29th day of December, A. D. 1900.

GEORGE F. RICKER.

Witnesses:
 N. C. LOMBARD,
 GEORGE H. BROWN.